Jan. 2, 1968  K. C. WHITEFIELD  3,361,891
WAFER MOUNTING APPARATUS
Filed Jan. 22, 1964  13 Sheets-Sheet 5
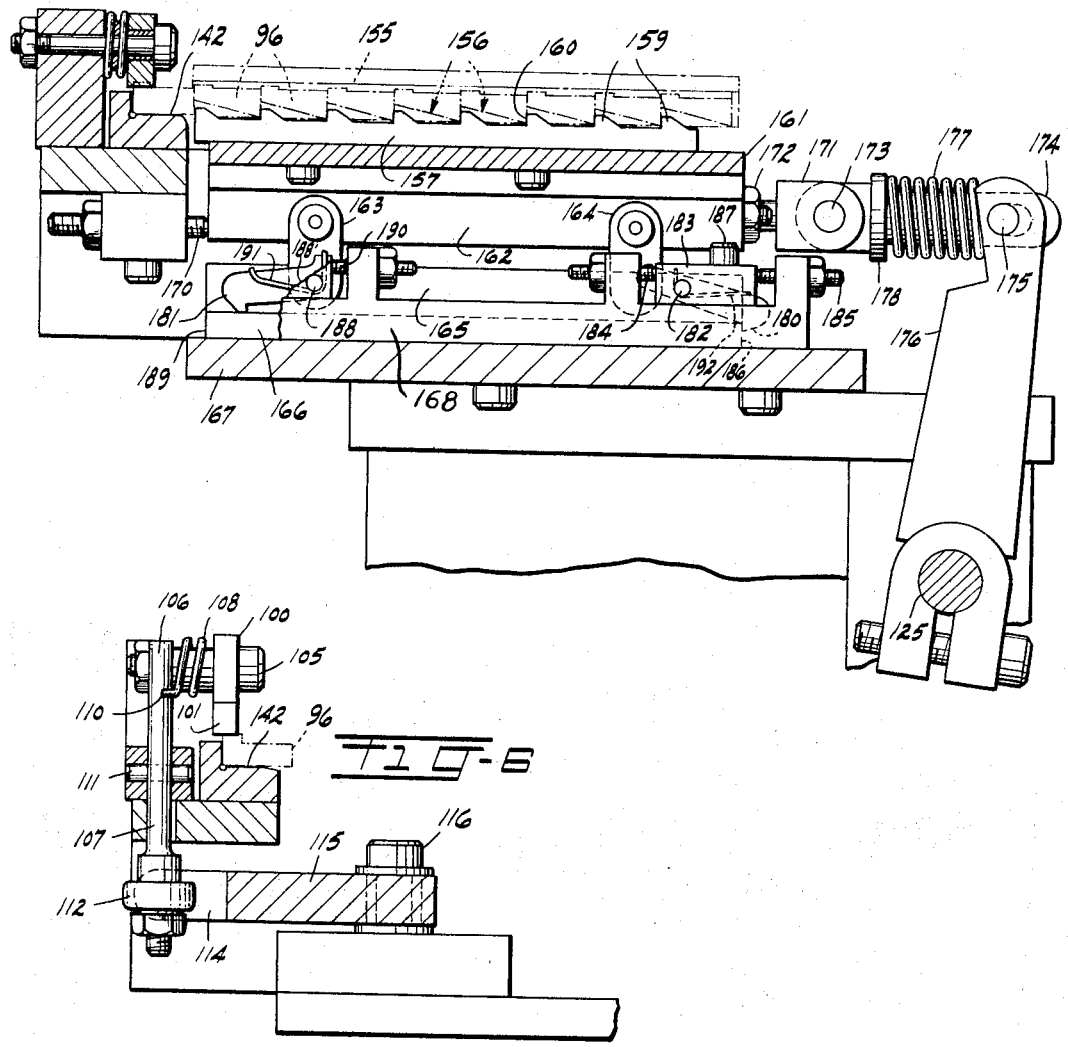

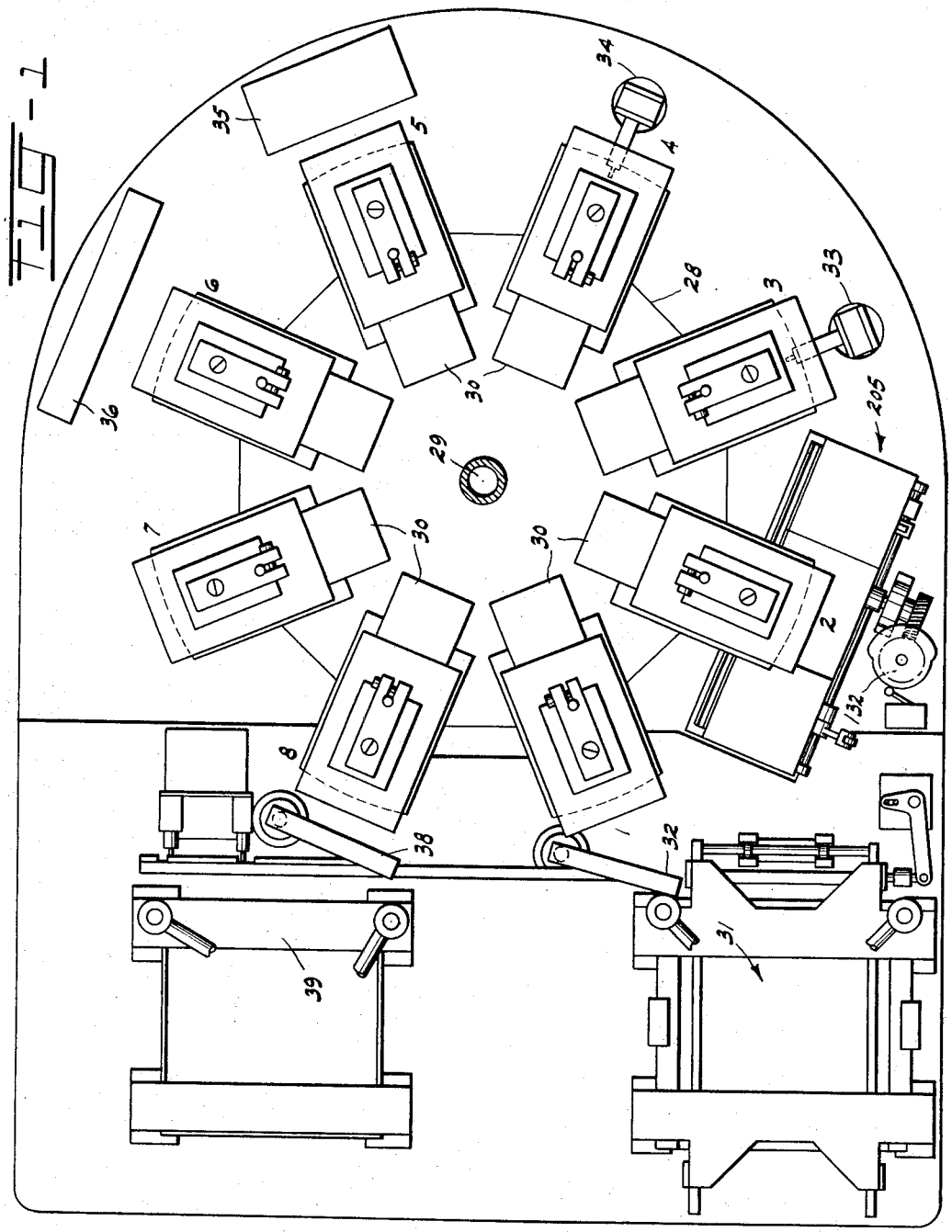

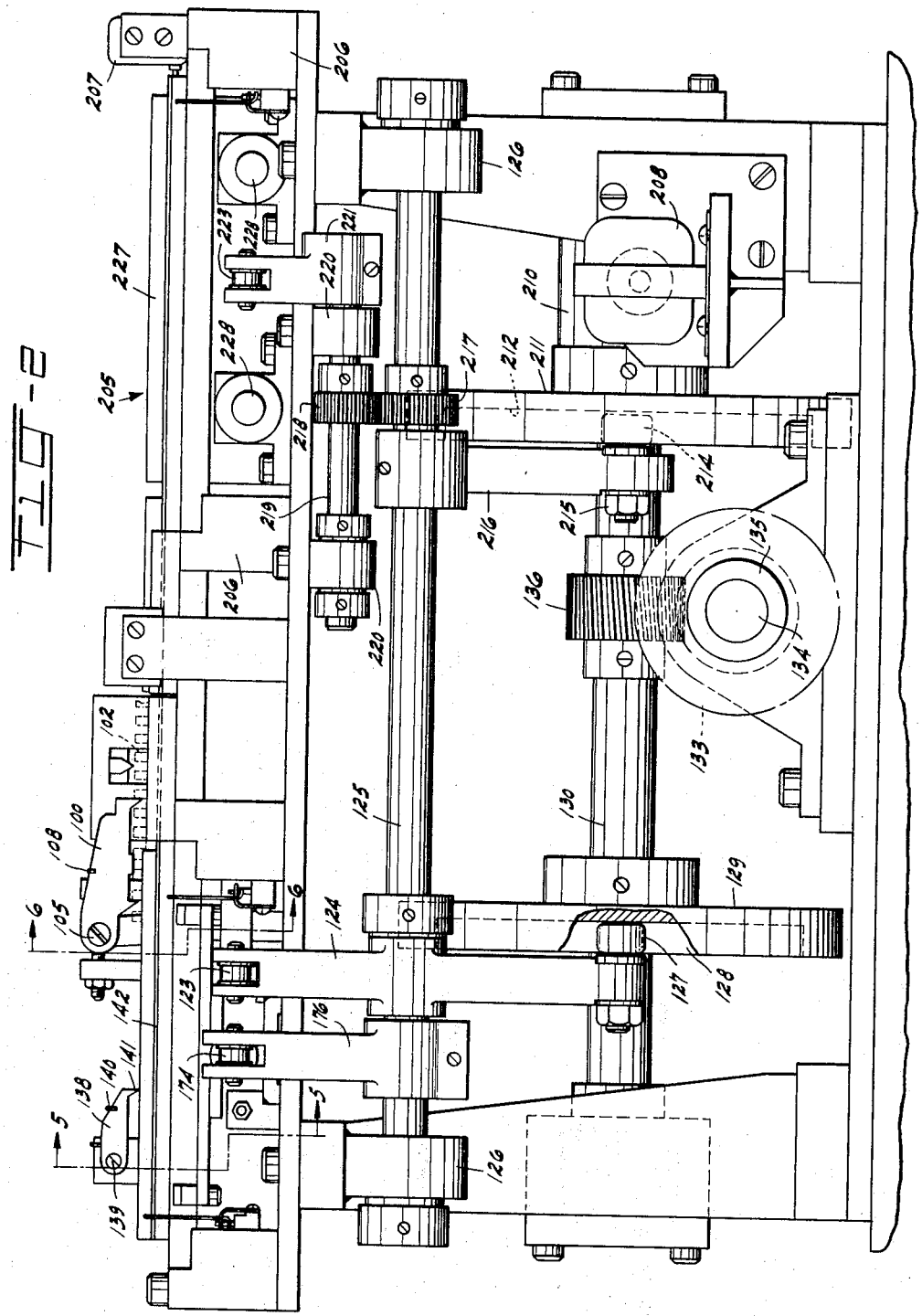

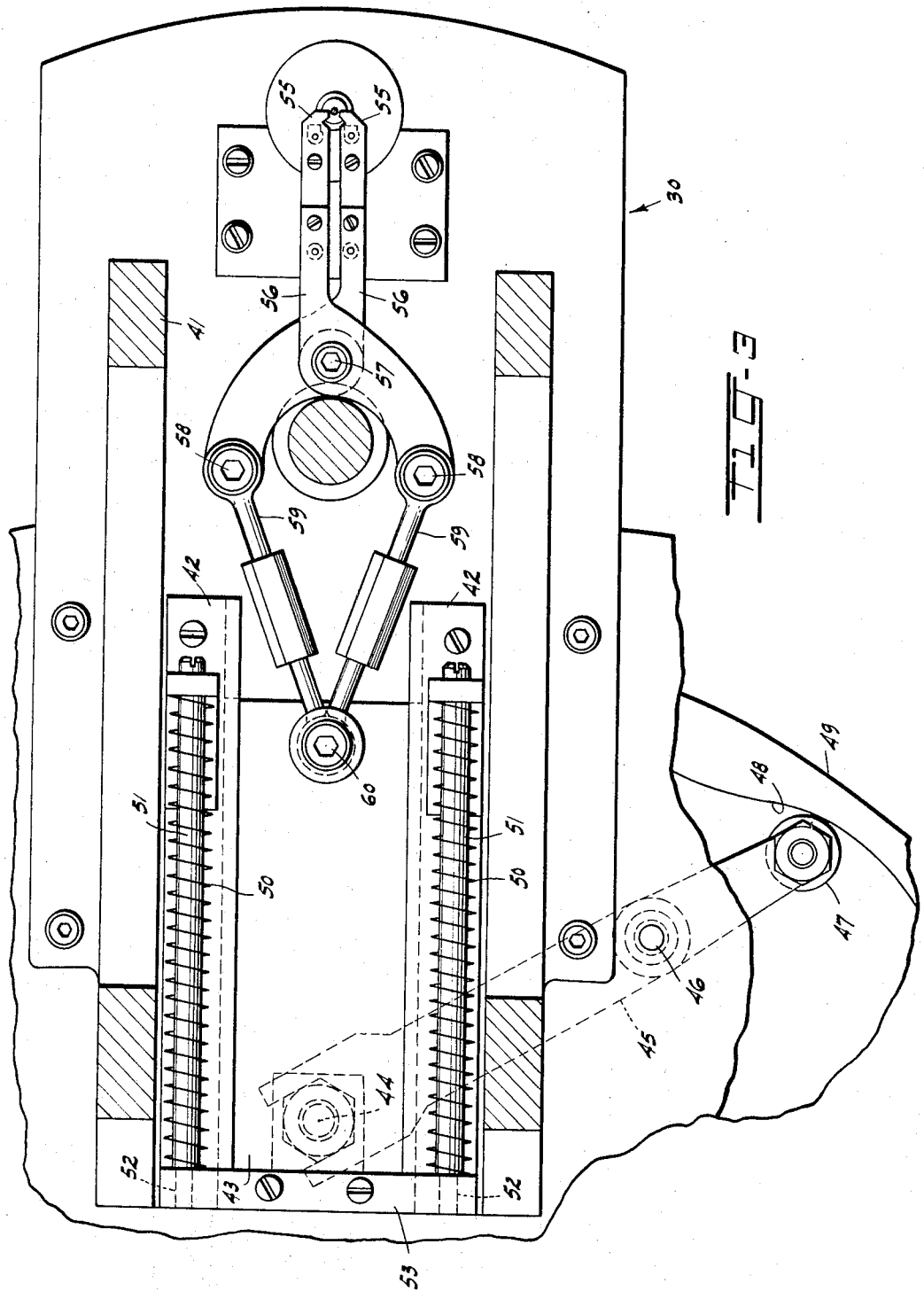

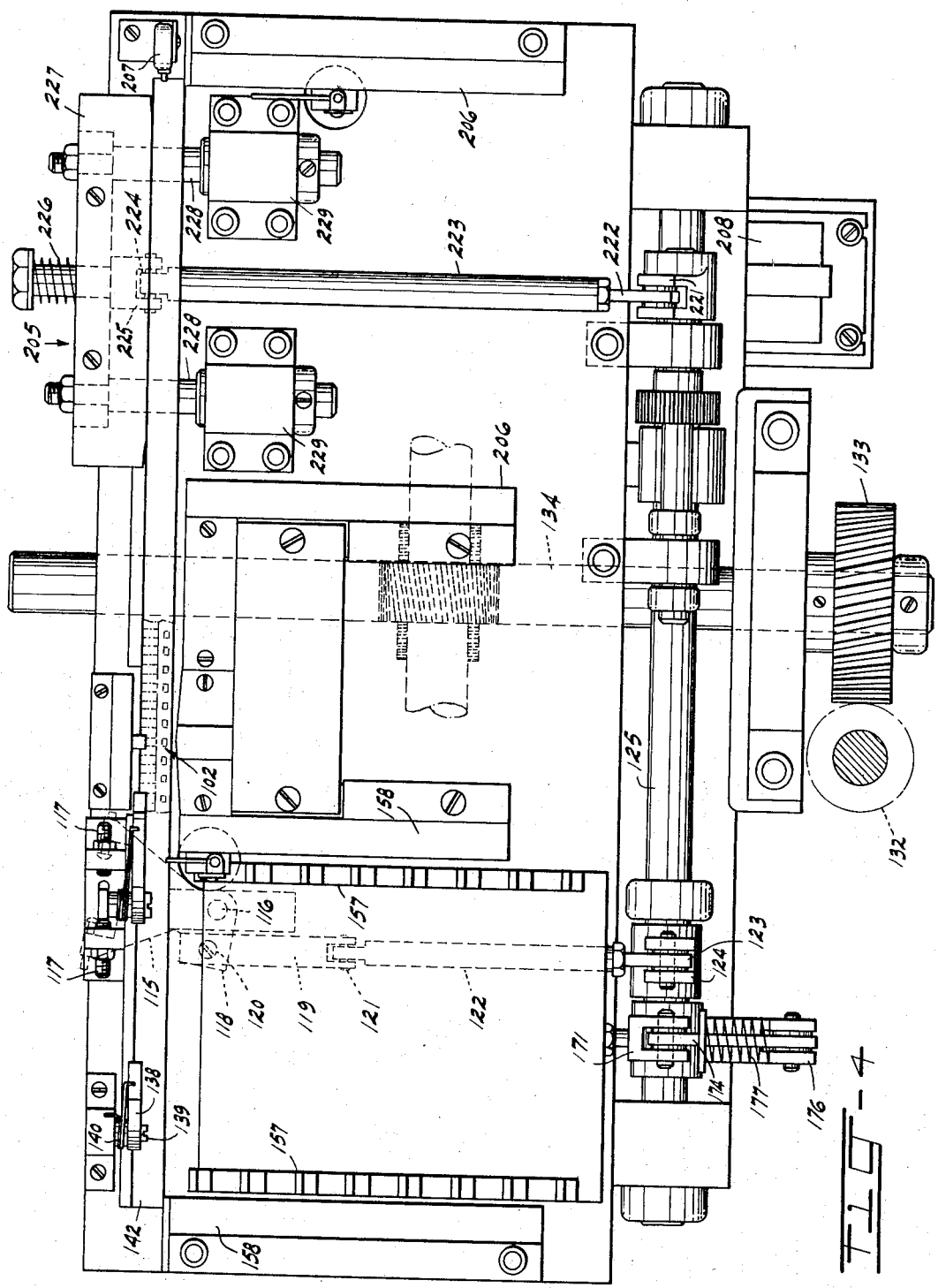

Jan. 2, 1968 K. C. WHITEFIELD 3,361,891
WAFER MOUNTING APPARATUS
Filed Jan. 22, 1964 13 Sheets-Sheet 7

Jan. 2, 1968  K. C. WHITEFIELD  3,361,891
WAFER MOUNTING APPARATUS
Filed Jan. 22, 1964  13 Sheets-Sheet 10

Jan. 2, 1968 K. C. WHITEFIELD 3,361,891
WAFER MOUNTING APPARATUS
Filed Jan. 22, 1964 13 Sheets-Sheet 11

Jan. 2, 1968    K. C. WHITEFIELD    3,361,891
WAFER MOUNTING APPARATUS
Filed Jan. 22, 1964    13 Sheets-Sheet 12
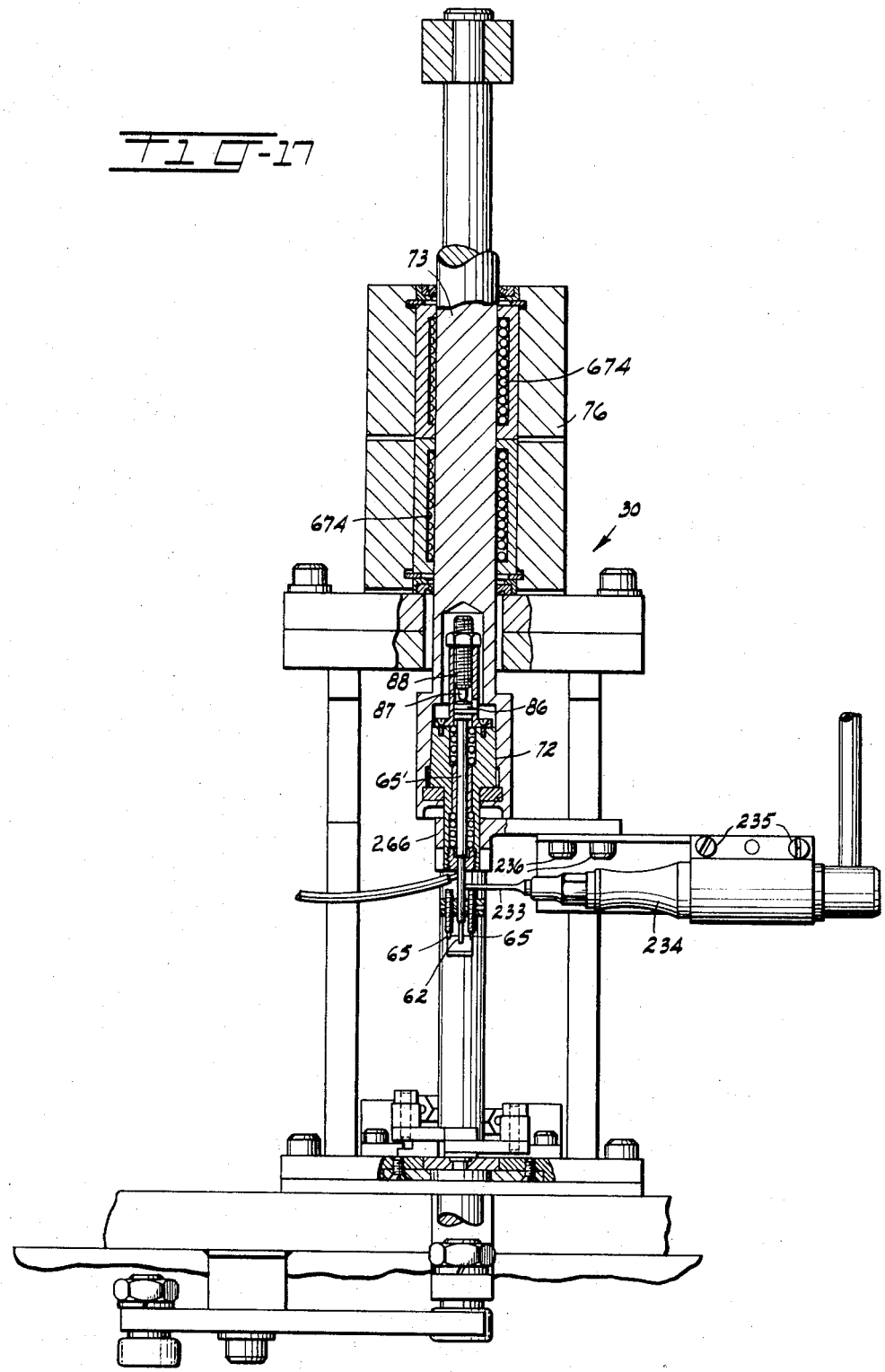

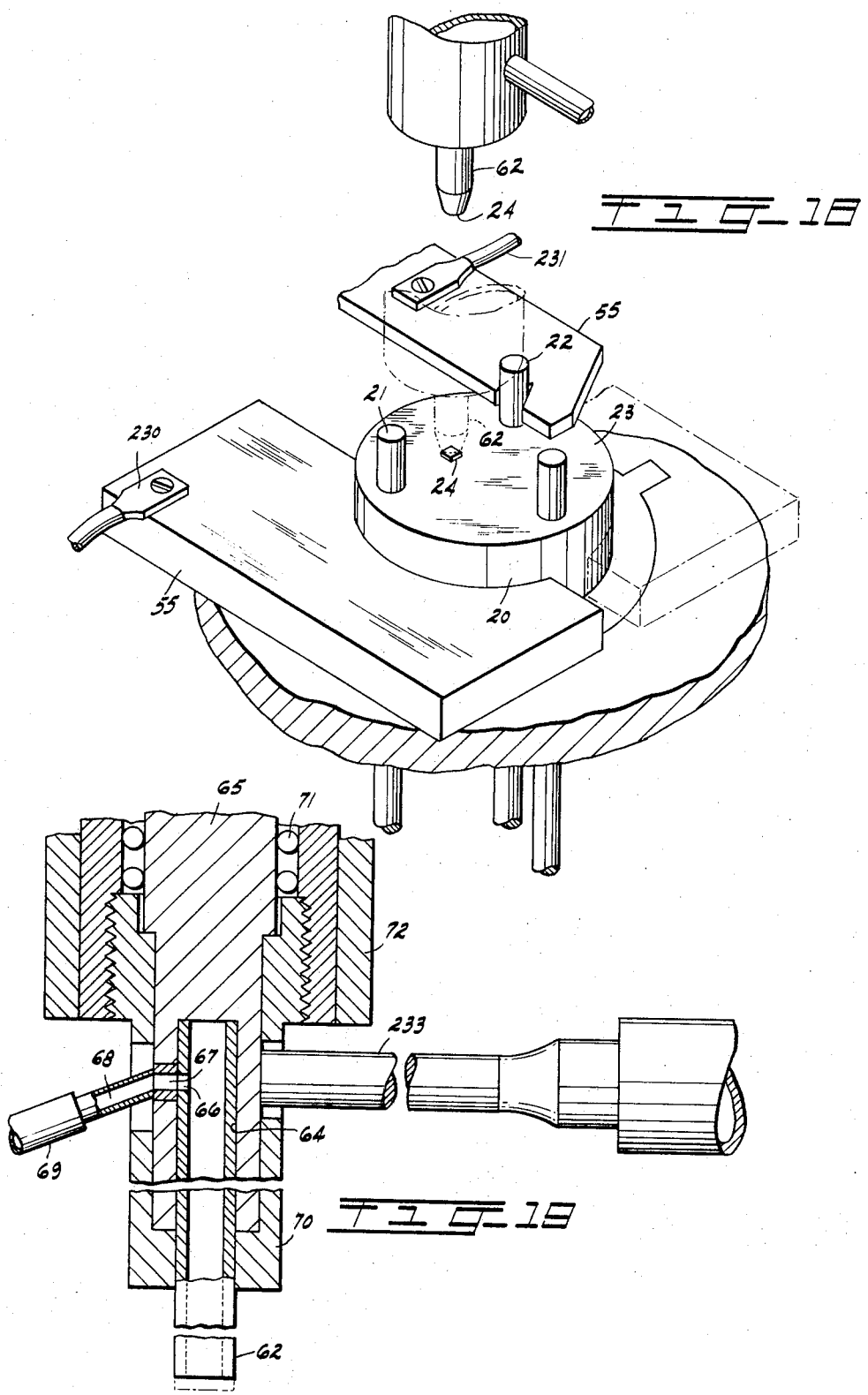

United States Patent Office 3,361,891
Patented Jan. 2, 1968

3,361,891
WAFER MOUNTING APPARATUS
Kyle C. Whitefield, Wyomissing, Pa., assignor to Western Electric Company, Incorporated, New York, N.Y., a corporation of New York
Filed Jan. 22, 1964, Ser. No. 339,537
19 Claims. (Cl. 219—85)

ABSTRACT OF THE DISCLOSURE

An apparatus for mounting wafers of like dimensions on component headers includes a turret moved intermittently between intervals of rests about an axis. Like units are mounted on the turret and are adapted to be located successively at component stations disposed about the axis. A nest for each unit is operated at one station to receive and hold a component. Wafers are fed successively at another station where a transfer element of each unit is actuated to receive a wafer and transfer it to the component. The wafer is bonded to a predetermined portion of the component.

---

This invention relates to apparatus for mounting parts, such as semiconductor wafers, on components such as transistor headers.

In the manufacture of certain types of transistors, semiconductor wafers such as germanium wafers of predetermined size are to be mounted accurately at given locations on the transistor headers between the main leads thereof. Subsequently, wires fixed to the main leads are to be bonded to striped areas of each wafer. If this should be accomplished by microscopic viewing, the manufacturing costs would be extremely high. However, to accomplish these results, particularly in the mounting of the wafer on the transistor header in mass production, an apparatus would have to be extremely accurate in every action to assure these desired results.

An object of the invention is an apparatus capable of accomplishing these results.

In accordance with the object, the invention comprises an apparatus having a plurality of like units moved intermittently between intervals of rest, between stations, and each provided with a shallow rimmed recess of a nest to receive and locate a transistor header at one station and a transfer element adapted to receive a wafer at a wafer feeding station and locate it on the transistor header at another station where control means is provided to bond the wafer to a given position on the header. More specifically, special trays are provided with nests or pockets spaced to accurately locate their respective wafers successively in the wafer feeding station so that they may be picked up accurately by the transfer element. Furthermore, each unit has a vibrating means in the form an ultrasonic probe and a pair of electrical heating contact jaws to assure efficient bonding of the wafer to the header.

Figure 7:
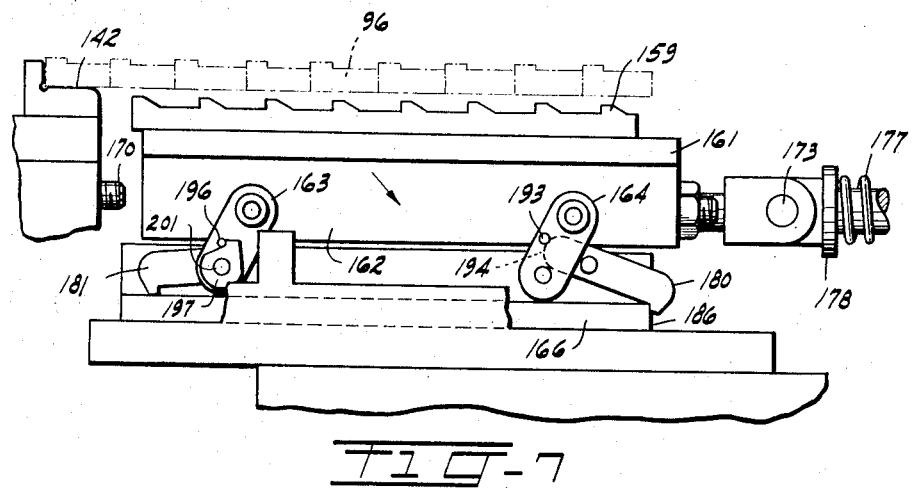
Figure 8:
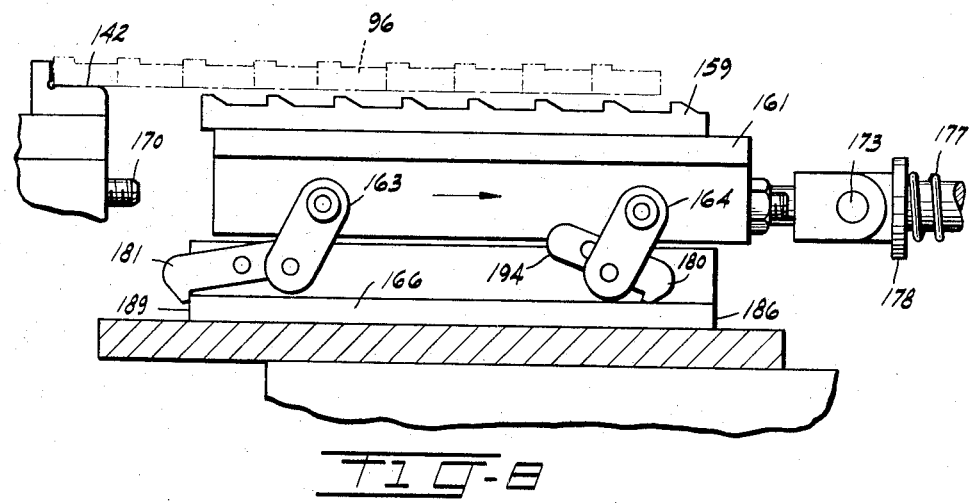
Figure 9:
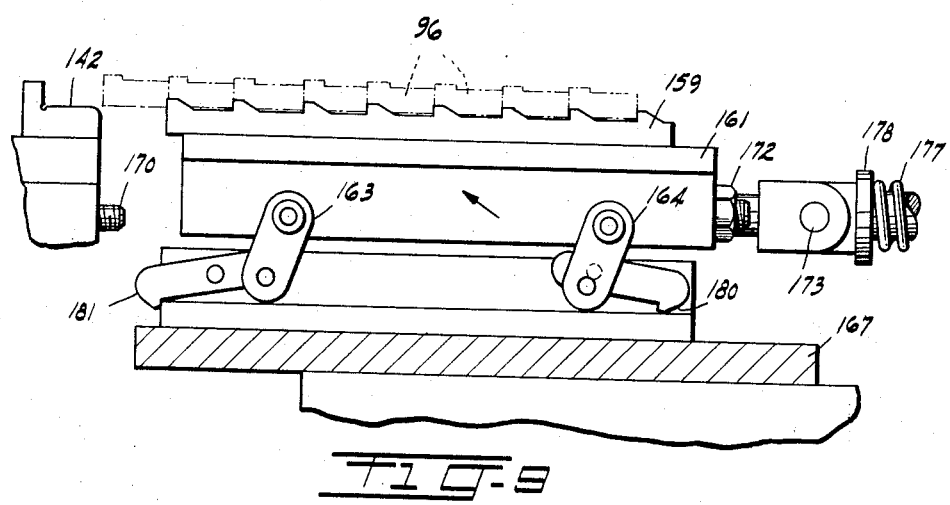
Figure 10:
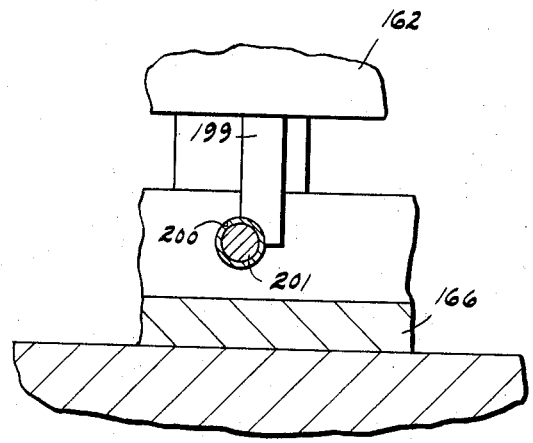
Figure 11:
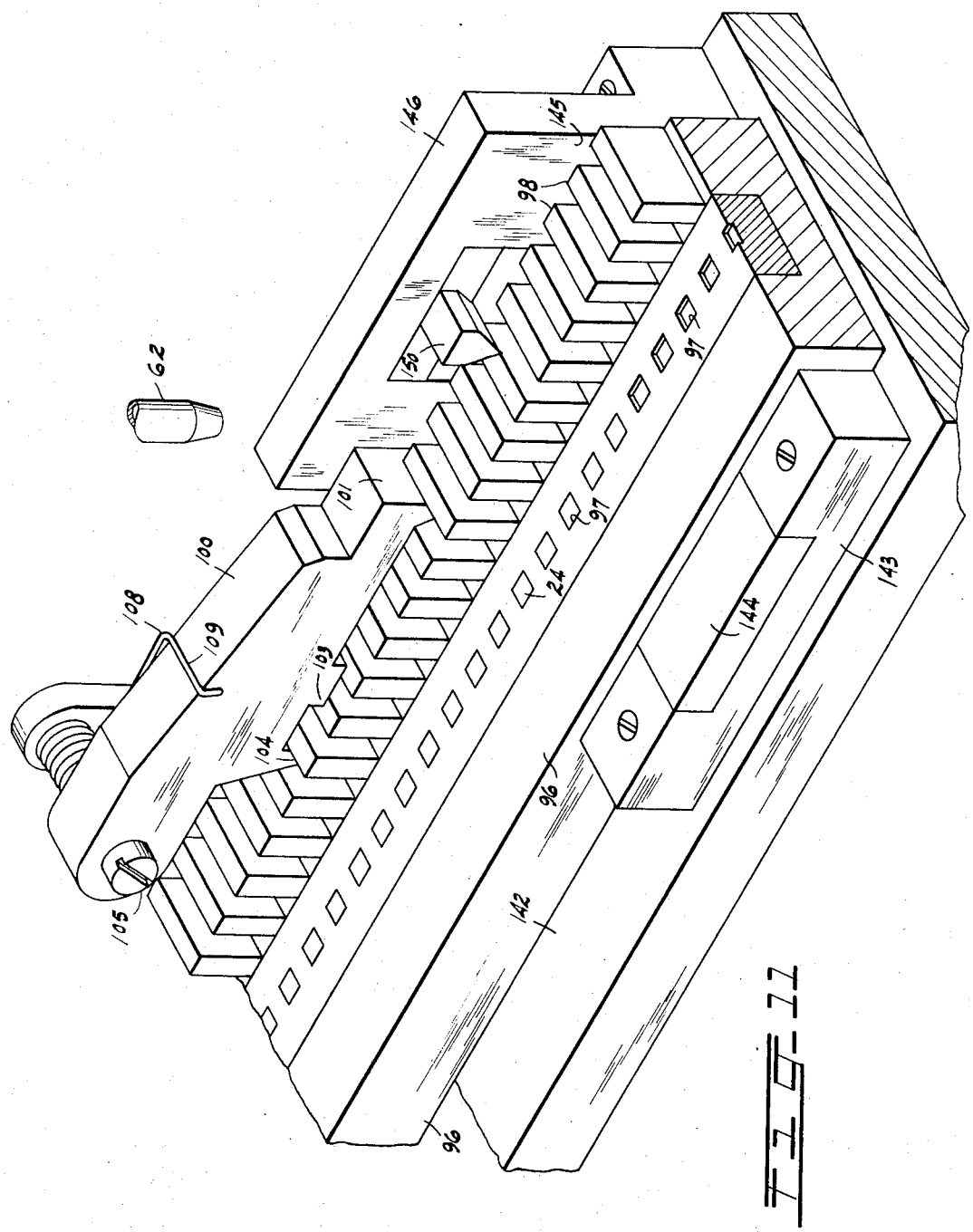
Figure 12:
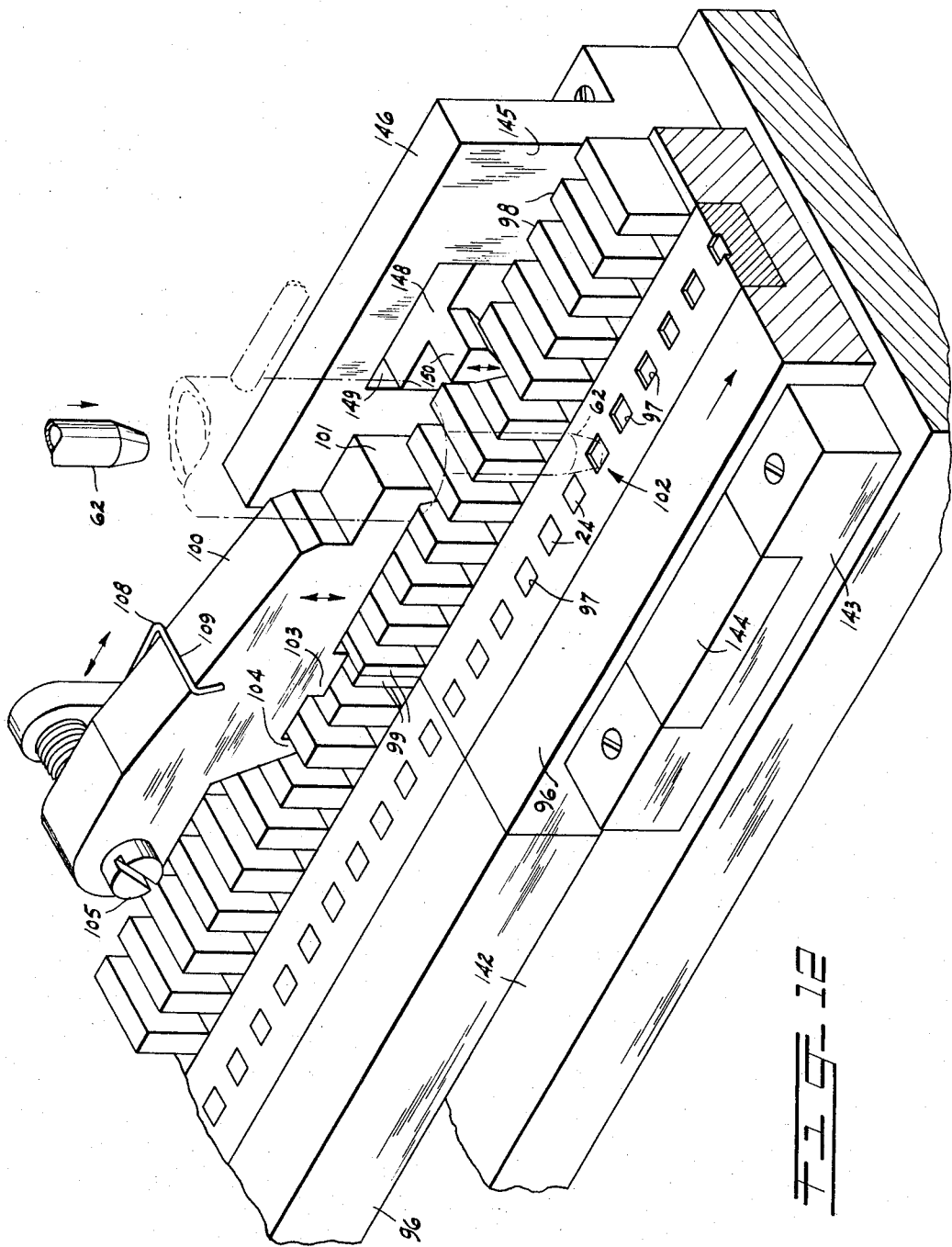
Figure 13:
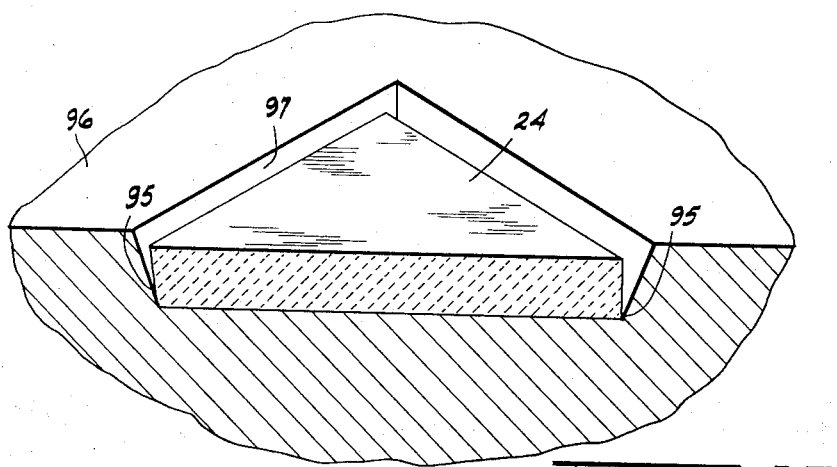
Figure 14:
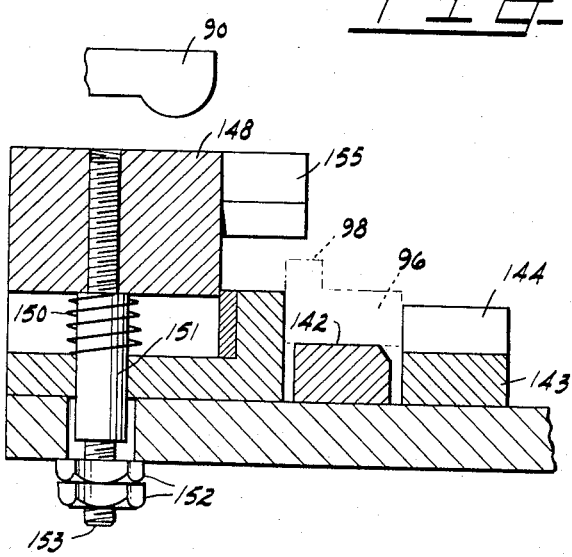
Figure 15:
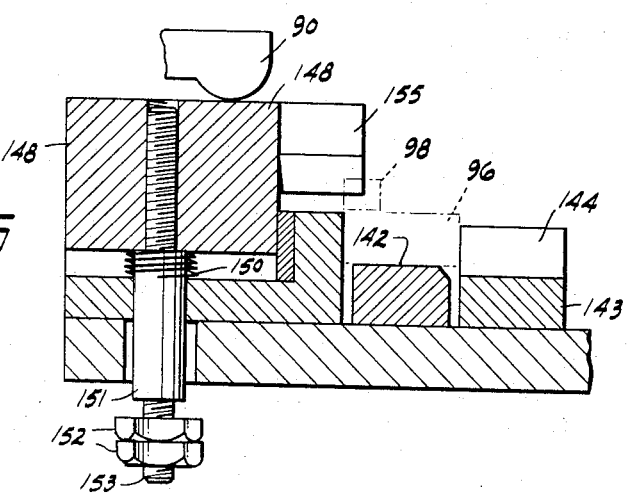
Figure 16:
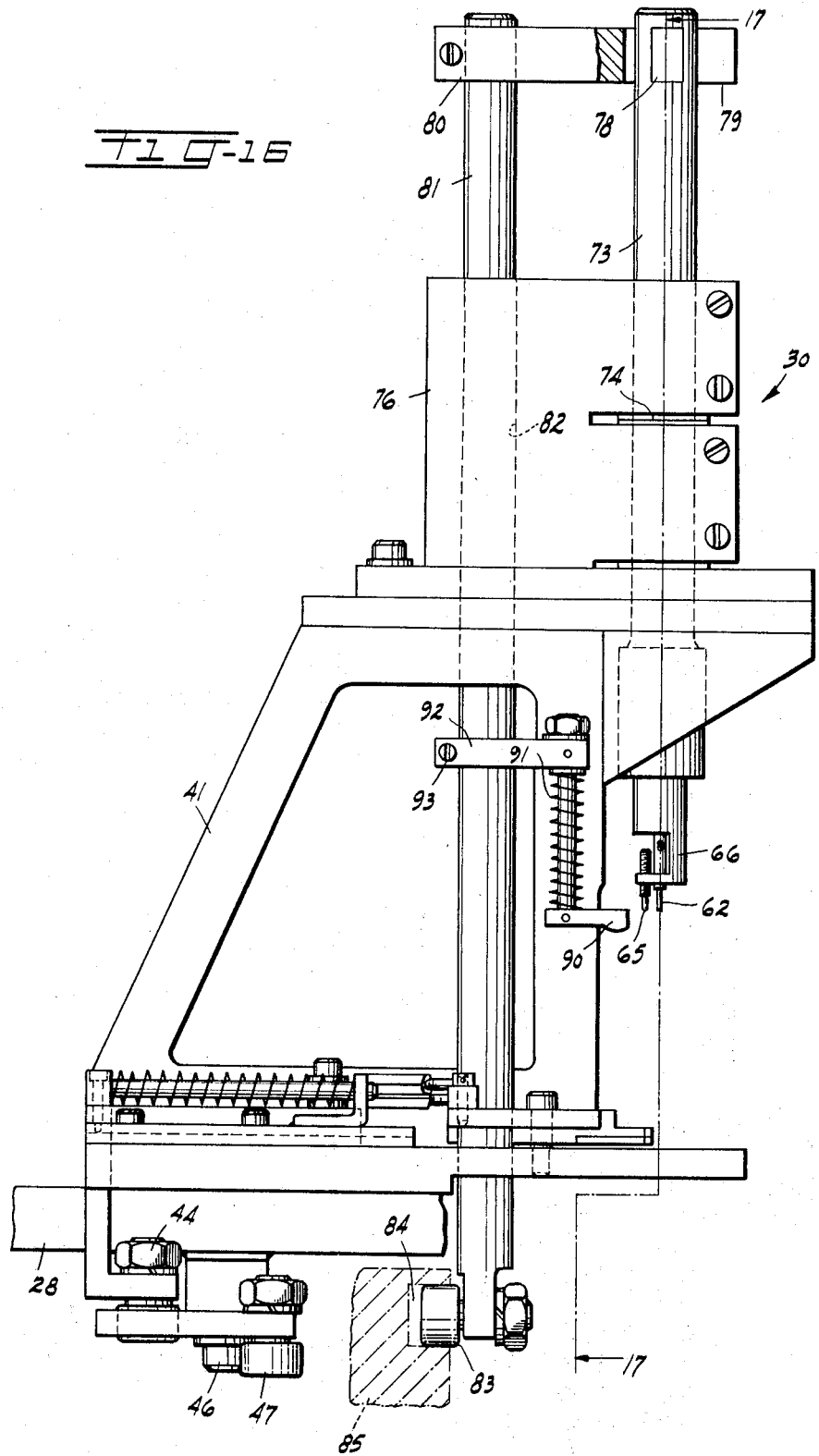

Other objects and advantages will be apparent from the following detailed description when considered in conjunction with the accompanying drawings wherein:

FIG. 1 is a top plan view of the apparatus,

FIG. 2 is a front elevational view of the wafer feeding means located at station 2, FIG. 3 is an enlarged horizontal sectional view illustrating the electrical heating contact jaws for each unit, FIG. 4 is a top plan view of the wafer feeding means shown in FIG. 2, FIG. 5 is a vertical sectional view of the loaded wafer tray feeding means shown at the end of its feeding stroke, this view being taken along the line 5—5 of FIG. 2, FIG. 6 is a fragmentary sectional view of the tray feeding means taken along the line 6—6 of FIG. 2, FIGS. 7, 8 and 9 are additional views of the tray feeding means shown in FIG. 5 illustrating different actions of this means, FIG. 10 is a fragmentary sectional view of a portion of the structure shown in FIG. 9 serving to control the action of this structure, FIG. 11 is an isometric view of the tray feeding means showing movement of the tray with a locator in open position, FIG. 12 is similar to FIG. 11 showing the locator in its down position to hold the tray in accurate position during the wafer pickup by the transfer element, FIG. 13 is an isometric sectional view of one of the wafer receiving pockets illustrating the location of the wafer therein, FIG. 14 is a fragmentary sectional view of the tray feeding means showing the locator in its open position, FIG. 15 is similar to FIG. 14 showing the locator in its down position, FIG. 16 is a side elevational view of one of the units, FIG. 17 is a vertical sectional view through one of the units, FIG. 18 is an enlarged isometric view of a transistor header illustrating the mounting of the wafer thereon, and FIG. 19 is an enlarged vertical sectional view of a portion of the transfer element of each unit.

The product of this apparatus, illustrated in FIG. 18, is a transistor header 20 having main leads 21 and 22 and an upper surface 23 upon which a wafer 24 is to be mounted. The wafer must be mounted accurately at a given position with respect to the main leads 21 and 22 so that subsequent wires from these main leads may be bonded more readily to predetermined portions of the wafer.

Apparatus in general

By viewing FIG. 1, it will be noted that the apparatus has a turret 28 mounted for movement about its axis 29 by any conventional means to move its eight identical units 30 so as to position them successively at the eight stations numbered 1 to 8 inclusive. At station 1, a supply means 31 is provided for the transistor header 20 and a transfer member 32 is adapted to move the headers singly from the supply 31 to the successive units 30 at station 1. The supply 31 and the transfer member 32 are not shown in detail and are illustrated solely to constitute means for supplying transistor headers to the units 30. At station 2, wafers carried in trays are supplied singly to each unit 30 at this station. Also at station 2, and during the index from station 2 to 3, pre-heat electrical current is applied to bring the header surface to near bonding temperature. At station 3, an infra-red sensitive heat control means 33 is provided to regulate the electrical heating current to bring the wafer, and particularly the header surface to bonding temperature while ultrasonic vibration is applied to the wafer to scrub the header surface. A similar unit 34 can be provided at station 4, and at this station, the wafer can, in the future, be wire bonded to the header posts. At stations 5 and 6, temperature controlling means may be provided to control the gradual cooling of the wafer and the adjacent area of the header. Nothing occurs at station 7, but at station 8, a transfer member 38 is provided to remove the transistor headers and its wafer from the unit 30 and place it in racks (not shown) of a receiving unit 39. The transfer member 38, and the receiving unit 39, are not shown in detail, but illustrate a means for removing the product from the apparatus.

The units 30

The eight units 30, mounted on the turret, are identical in structure and a description of the unit shown in FIGS. 3, 16, 17, 18, and 19 will apply to all units. This unit includes a frame structure 41, mounted on the turret 28, and having guides 42 for a slide 43. The slide 43 is operatively connected at 44 to one end of a cam lever 45 which is pivotally supported at 46, the other end of the cam lever carrying a roller 47 riding upon a surface 48 of a cam 49. The slide 43 is urged to the left by springs 50, disposed concentric with rods 51 which have their left ends 52 connected to a lateral member 53 of the slide, which serve not only to hold the cam roller 47 against the surface 48, but to supply a force necessary to swing the electrical heating contact jaws 55 onto the header surface near the main leads 21 and 22 as shown in FIG. 18. The electrical heating contact jaws 55 are mounted on the ends of levers 56, which are pivotally mounted at 57 and have their inner ends connected at 58 to the adjacent ends of adjustable rods 59. The other ends of adjustable rods are pivotally connected at 60 to the adjacent end of the slide 43 so that movement to the right of the slide will cause the electrical heating contact jaws 55 to swing open, and movement to the left will cause the jaws to swing close. In the closed position, these notched contact jaws not only provide electrical contact for heating the header surface but they also V-locate the main leads accurately with respect to the wafer transfer element.

The notched electrical heating contact jaws shown in FIG. 18 represent only one possible arrangement for electrical heating contact to the header. Another arrangement more widely used currently is to make contact to the cylindrical portion of the header platform; this sacrifices some accuracy of location of the wafer with respect to the main leads, but provides for less maintenance replacement of contacts and for less supervision to obtain consistent heating.

Each unit 30 has a hollow transfer element 62 FIGS. 16 to 19 inclusive, which, in the present instance, is substantially round in cross-section and has an open lower end similar in size to the overall dimension of the wafer 24. The transfer element 62 is supported with its upper end mounted in an aperture 64 in the lower end of a limit rod 65. An opening 66, in the transfer element 62, is positioned normally in registration with a passageway 67 adapted to be disposed in communication with a passageway 68 connected to a suction hose 69 so that through the aid of suction the wafer 24 may be picked up by the transfer element 62. The rod 65 is controlled in its downward movement by a hollow member 70 and is guided by ball bearings 71 disposed in a housing-type structure 72 mounted at the lower end of a reciprocating rod 73 extending through bearing 74 in a housing 76. The upper end of the rod 73 is connected at 78 to one end of an arm 79, the other end of the arm connected at 80 to a cam rod 81 movable vertically in guide means 82 in the housing 76. The cam rod 81 has a cam roller 83 mounted on the lower end thereof adapted to ride in a groove 84 of a cam 85, the groove being adapted to impart the desired vertical movements through the cam rod and eventually to the transfer element 62. The transfer element 62, particularly its supporting limit rod 65, has a head 86 positioned to engage a spring-pressed plunger 87 adjustably mounted at 88 to limit the force applied by the transfer element 62 in picking up a wafer and positioning it on the transistor header. Returning to the cam rod 81, an actuator 90 supported by a spring-pressed member 91 is carried by an arm 92 mounted at 93 on the cam rod. The purpose of the actuator 90 is to operate a wafer tray pocket locating member in the area of the wafer feeding means.

*Wafer feeding means*

The wafer feeding means is shown in FIGS. 4 to 15 inclusive. In the present instance, the wafers 24 are identical in size and have certain characteristics as to their contours in that they were produced from slices after the slices were crystal-oriented and scribed, marking the slices into identical squares through the aid of tools which produced scribe-lines forming grooves of like angles so that when each slice was broken along longitudinal lines into strips and the strips broken along the lateral lines into wafers, each wafer was provided with like cleavage surfaces 95 (FIG. 13) along edges of all wafers. This condition, therefore, was utilized when providing trays 96 (FIGS. 11 and 12) to receive the wafers and to feed them accurately to the wafer feeding station 2. The trays are provided with nests or pockets 97 of like depths to support the wafers, and are provided with sloping wall-like surfaces clearing the cleavage angles of the edges 95 and also camming the wafers accurately to known spaced positions in each tray and each tray pocket. The trays 96 are of the contour shown in FIGS. 11 and 12 with vertical members 98 mounted at like spaced positions and of predetermined widths with exceptions at the end of the trays. At the leading and trailing end of each tray half members 99 are disposed so that the trailing half member of one tray as shown in FIG. 12 and the leading half member of the following tray jointly occupy the space of one full member in association with the advancing element 100. The advancing element 100 has a leading member 101 adapted to be positioned successively back of each full member 98 or each pair of half members 99 and to push the members successively forwardly a given distance to thereby successively locate a pocket 97 with a wafer 24 therein at the wafer feeding position 102 where the transfer element 62 will pick up the wafer. The element 100 has a flat-surfaced projection 103 adapted to rest on adjacent members 98 limiting the downward movement of the element 62. A trailing feeder 104 functions to pick up the trailing tray 96 and move along with the leading tray until, eventually, the main member 101 continues its advancement. The element 100 is pivotally mounted on a spindle 105 which is supported at 106 by the upper end of a lever 107. A spring 108, supported mainly by the spindle 105, has one end 109 extending over the top of the element 100 and the other end 110 extending back of the lever 107 (in FIG. 6) to normally urge the element 100 clockwise, FIGS. 2 and 12. The lever 106 (FIG. 6) is pivotally supported at 111 and has a roller 112 mounted near its lower end and positioned between bifurcated end 114 of a lever 115. The lever 115 (FIGS. 4 and 6) is pivotally mounted at 116 and carries spaced adjustable members 117 adapted to engage the roller 112 at different intervals to bring about rocking movements to the lever during each advancing cycle of the element 100. The lever 115 has an arm 118 extending laterally therefrom to which one end of a link 119 is connected at 120. The other end of the link 119 is connected at 121 to one end of a rod 122, the other end of the rod being connected at 123 to a lever 124. The lever 124 (FIGS. 2 and 4) is free to rotate on a shaft 125, the ends of the shaft 125 being supported by bearings in bars 126. The lower end of the lever 124 (FIG. 2) supports a cam roller 127 positioned to ride in a groove 128 of a cam 129, which is fixed to a shaft 130. The shaft 130 is driven continuously by suitable drive means so that, during each cycle of rotation, the shaft 130 causes the element 100 (FIGS. 11 and 12) to move through one complete advancing cycle for the trays 96. The driving means for the shaft 130 (FIGS. 2 and 4) includes a drive gear 132, driving a gear 133, which is mounted on a shaft 134. The shaft 134 has a helical gear 135 mounted thereon, interengaging a helical gear 136 mounted on the shaft 130.

Through this connection, the shaft 130 is driven continuously in timed relation with the driving means for the turret 28. An element 138, pivotally supported at 139 (upper left, FIG. 2) and normally urged clockwise by a spring 140 similar to the spring 108 for the element 100, causes a retaining portion 141 thereof to engage the members 98 of the adjacent trays to keep the trays from moving back on a track 142 upon which the trays are disposed. FIG. 12 illustrates a holder 143 for a wear resistant locating member 144, such as a hardened steel block serving to locate the tray moving through the wafer pickup area at a predetermined position on the track 142 under pressure of a spring means mounted on guide wall 145. Directly opposite the member 144 and located in a bracket 146 which provides the guide wall 145 is a locator 148. The locator 148, in its aperture 149 of the bracket 146, is urged upwardly through suitable spring means shown in FIGS. 14 and 15 at 150. The locator 148 is supported by a guide rod 151 having adjustable members 152 on a threaded lower end 153 of the rod limiting the upper movement of the locator so that a projection 155 thereof may clear the members 98 of each tray 96 when in the up position shown in FIG. 14, but will wedge between the members 98 to accurately locate the tray at the wafer loading station prior to the picking up of each wafer to assure accurate positioning of each wafer relative to the transfer element 62. The actuator 90, mounted on the cam rod 81 FIG. 16 serves to move the locator 148 vertically downward during each machine cycle.

The trays 96 are disposed closely adjacent parallel positions in a tray loading area with the ends of the trays supported by a tray magazine supported accurately on pads 158 (FIG. 4). Furthermore, the trays have notches 156 (FIG. 5) in their undersurface near their outer ends to clear feeders 157. The feeders 157 are of the contour shown in FIGS. 5, 7, 8 and 9 with projections 159 receivable with clearance in the notches 156 and provided with leading edges 160 to engage the trailing surfaces of the trays, thus providing numerous pairs of finger-like projections on the pair of feeders 157, each pair of fingers being adapted to engage a single tray and move it toward the track 142. The pair of feeders 157 is mounted on a table 161 which is provided with a central lower portion 162 supported by the upper ends of pairs of links 163 and 164. The lower ends of the links 163 and 164 are pivotally connected to both sides of an upper central portion 165 of a slide 166. The slide 166 is located on a support 167 between guides 168 fixedly mounted on the support. An adjustable stop 170 limits the forward feeding motion of the table 161. Motion is imparted to the table through a bifurcated member 171 mounted on the table at 172 and connected at 173 to one end of a link 174, the other end of the link 174 being connected at 175 to the upper end of a lever 176. A cushioning spring 177 is disposed concentric with the link 174 and interposed between the adjacent end of the lever 176 and a collar 178 on the link. The lever 176 is fixedly mounted on the shaft 125, FIG. 2. The driving action of the shaft 125 will hereinafter be described.

Returning to FIGS. 5, 7, 8, 9 and 10, attention is directed to the fact that, in addition to the forward left and back right motions to be imparted to the feeders 157, two additional motions are required; (1) to move the feeders upwardly prior to the ir forward motions to thereby move the projection 159 into the notches 156 of the trays, and (2) to move the feeders downwardly to thereby free the projection 159 from the notches at the end of the feeding stroke so that the feeders may return to their starting positions out of engagement with the trays. These actions are brought about through the assistance of latches 180 and 181 FIG. 7 together with the links 163 and 164. The latch 180 (FIG. 5) is pivotally supported at 182 in a block 183 which is supported by the adjacent guide for slide 166 and may be adjusted thereon through the aid of threaded members 184 and 185 to locate the latch 180 in a desired position to engage the forward or right edge 186 of the slide 166. The block 183 (FIGURE 5) may be fixed at a desired location by a screw 187. The latch 181 is pivotally supported at 188 in a block 188' identical with the block 183 for the latch 180. The latch 181 engages the left end 189 of the slide 166. A spring 191 normally urges the latch 181 counterclockwise and a similar spring 192 urges the latch 180 clockwise.

With the tray feeding means in the position shown in FIGURE 5 at the end of the tray feeding stroke, it will be noted that the links 163 and 164 are in their vertical positions with the table 161 and the feeders 159 in their upermost positions. Furthermore, the latch 181 is in its open position located on the upper surface of the slide 166 whereas the latch 180 is in its closed position engaging the right end 186 of the slide. Operation of the shaft 125 to rock the lever 176 clockwise will cause movement of the table 161 to rotate the links 163 and 164 about their lower pivots while the latch 180 holds the slide 166 against movement. Near the end of this rotation of links 163 and 164, a pin 193, mounted on one of the links 164, FIGURE 7, engages an end 194 of the latch 180 to rock the latch 180 about its pivot into its up or open position free of the end 186 of the slide 166 so that additional action of the lever 176 will move the slide with the table 161. However, during this initial action of the table 161 to move the links 163 and 164 into their rotated positions, the table is lowered toward the slide a distance sufficient to remove the projections (or fingers) 159 from the notches 156 of the trays leaving the trays undisturbed. The contiued outward travel of table 161 and slide 166 then locates the projections 159 so that they will enter the next set of notches so that each projection will engage the tray back of its preceding tray during the next forward stroke. At the end of this return stroke, the slide 166 has moved to the position shown in FIGURE 8 where the latch 181 will be free to be moved by its spring 191 into engagement with the adjacent end 189 of the slide 166. This mechanism is now ready for its back stroke applied to the table through operation of the lever 176. During the first portion of this stroke, the slide 166 is held by the latch 181 until the links 163 and 164 are moved to their vertical positions at which time a pin 196 on one of the links 163 engages a surface 197 of the latch 181 forcing the latch open to free the slide to move inward with further movement of the table 161. When the links are in their vertical positions and after the projections or fingers 159 of the feeders 157 are moved upwardly into the new notches or into engagement with the next set of trays, the relative movement of the table 161 and the slide 166 is limited by suitable means such as that shown in FIGURE 10. This means includes a projection 199 of the portion 162 of the table having an arcuate surface 200 positioned to engage the lower pivot 201 of the pair of links 163 stopping the forward motion of the table relative to the slide 166 when the links are in their vertical positions. These actions have been described somewhat in their reverse order because when it is time to feed a new tray on the track 142, this structure, through the action of the lever 176, rotates first counterclockwise to feed in and then immediately thereafter clockwise to retract. The trays are advanced to position the leading tray on the track 142 and to return, without disturbing the remaining trays, to the starting position.

Beyond the wafer feeding position 102 (FIGURE 2) there is a receiving unit indicated generally at 205 FIGURES 1, 2 and 4 where pads 206 with locating dowels are provided to hold a wafer tray magazine to receive the empty trays 96. A switch 207, mounted at the end of the track 142, is in a circuit (not shown) including a solenoid 208 which, when energized by the leading end of an empty tray, will cause operation of a one revolution clutch 210 to connect a cam 211 to the shaft 130 for one revolution of the shaft. The cam 211 is of the grooved-type having a cam groove 212 in which a cam follower or roller 214 is disposed. The roller 214 is mounted at 215 on the lower end of a cam lever 216, which is mounted on the shaft 125. A gear 217, mounted at the shaft 125, interengages a gear 218 mounted on a shaft 219. The shaft 219 is journalled in suitable bearings 220 and has a lever 221 fixedly mounted thereon. The lever 221 is connected at 222 (FIGURE 4) to one end of an adjustable rod 223, the other end of the rod being pivotally connected at 224 to a yoke 225 of a spring-controlled member 226, the member and the spring forming a cushioned-connection with a push-block 227. The push-block is supported by parallel rods 228, supported by bushings 229 to serve in guiding the block 227 in its movement to move an empty tray off the track 142 and into the exit tray magazine on pads 206. During each cycle of the cam 211, the block 227 is moved forwardly to move the empty tray off the track 142 and move it and other trays forwardly on the guides 206. The push-block 227 is returned to its starting position so as to interrupt the forward feeding of the trays.

Certain features are utilized in completing the bonding of the wafer to the header, these means being shown in FIGS. 18 and 19. In FIG. 18, terminal leads 230 and 231 are shown connected to the electrical heating contact jaws 55. Through suitable circuits including these leads, the bonding heating of the header (and thus the wafer may be accomplished).

One of the troublesome conditions in bonding semiconductor wafers to any surface is the removal of surface oxides from the bonding area of the wafer and its contacting surface. Previously, the parts were pre-scrubbed manually at the bonding area of each header and much higher bonding temperatures were required. In the present structure, an ultrasonic probe 233 (FIGS. 17 and 19) has its housing 234 mounted at 235 and 236 on the support 266 so that the probe 233 will, at all times, engage the hollow member 65 supporting the transfer element 62 to be in very close contact with the transfer element to create desired vibrating actions or motions of the transfer element. The ultrasonic energy is produced in the probe 233 by a transducer energized by an ultrasonic generator (not shown) and thus transferred to the element 62 through the member 65. The transfer element may be in immediate and rigid contact with the ultrasonic probe 233, if so desired, the result required being to cause the transfer element to be vibrated minutely at the ultrasonic frequency so as to agitate the wafer against the header, breaking up the surface oxides. Actually, although the bonding heating is in process, bonding will not be accomplished until the ultrasonic energy is in effect after the eutectic temperature has been reached.

*Operation*

In following the units 30 from station to station, it will be understood that when entering station 1, the electrical heating contact jaws 55 will be open to allow a transistor header 20 from the supply unit 31 to be placed in the unit 30 nest by the transfer arm 32. While indexing out of this station, the electrical heating contact jaws 55 will be closed to locate the main leads of the transistor header 20 in a given position and to provide contact for electrical current flow heating of the header.

At station 2, the tray and wafer feeding means (shown particularly in FIGS. 2, 4, 11, and 12) are to be operated to locate a wafer 24 at the wafer receiving posietion 102. During downward movement of the cam rod 81 (FIG. 16), through action of the cam 85, the transfer element is caused to move downwardly to engage the wafer. Through suction, the wafer is lifted out of its nest 97 as the transfer element is raised.

Between station 2 and station 3, the wafer is lowered to contact the header and thereby be under the influence of the heating control unit 33, FIG. 1.

At station 3, the heating control unit 33 functions to bring the wafer and the bonding area of the header to the bonding temperature. At this time, the ultrasonic probe is energized to complete bonding of the wafer to the header.

At stations 4, 5 and 6, the temperature of the wafer and the adjacent area of the transistor header may be controlled through the unit 34 or by other means.

Finally, at station 8, each header is removed from the unit 30 by opening the electrical heating contact jaws 55 (FIG. 3) and placing the header in the unit 39.

The wafer supply trays and the tray feeding means, shown in FIGS. 2 and 4 to 15, permit automatic operation of the apparatus with continuous supplies of wafers which are accurately positioned so that the transfer element 62, of each unit 30, can receive a wafer and deposit and hold it accurately on each transistor header during the bonding operation. Furthermore, the trays are so constructed with respect to the formation of the wafers that the mere placing of a wafer in a pocket or nest 97 will assure its accurate positioning on the transfer element 62. Also, the feeding means associated with the trays through the advancing element 100, the locating element 148, assures continuous accurate feeding or positioning of the wafers to be received by the successive transfer elements.

It is to be understood that the above-described arrangements are simply illustrative of the application of the invention. Numerous other arrangements may be readily devised by those skilled in the art which will embody the principles of the invention and fall within the spirit and scope thereof.

What is claimed is:

1. An apparatus for mounting semiconductor wafers on transistor headers comprising:
   a turret;
   means for rotating said turret intermittently about its axis;
   a plurality of like units mounted on said turret and adapted to be located successively at different stations disposed about its axis;
   means for supplying transistor headers at a first of said stations;
   means for transferring a transistor header from said supply means to each of said units, one at a time in succession;
   means for feeding semiconductor wafers successively at a second of said stations;
   receiving means at another of said stations; and
   means for transferring wafer-mounted headers from said units to said receiving means;
   each of said units including
   (a) a nest operable at said first station to receive and hold a transistor header,
   (b) a transfer means adapted to receive a wafer from said feeding means at said second station and locate said wafer on a transistor header at a subsequent station, and
   (c) means for causing bonding of said wafer onto said transistor header.

2. An apparatus for mounting wafers according to claim 1 in which:
   the feeding means for the wafers includes elongated trays having aligned equally spaced pockets to receive the wafers, and
   an elongated track extending through the wafer feeding station to support the trays for movement thereon.

3. An apparatus for mounting wafers according to claim 2 in which:
   the feeding means for the wafers further includes
      a supply unit mounted adjacent the track in advance of the wafer feeding station and adapted to support a plurality of trays having their pockets loaded with wafers parallel with the track.

4. An apparatus for mounting wafers according to claim 3 in which:
   the feeding means for the wafers further includes
      means operable to move the loaded trays in the supply unit toward the track to position the leading loaded tray on the track.

5. An apparatus for mounting wafers according to claim 4 in which:
   the feeding means for the wafers further includes
      a feeding element disposed adjacent the track, and
      means to actuate the feeding element intermittently to move a tray to successively position a wafer at the wafer feeding station.

6. An apparatus for mounting wafers according to claim 5 in which:
the feeding means for the wafers further includes
a first member carried by the feeding element to engage a leading tray to move it, and
a second member carried by the feeding element to engage a following tray and cause it to follow the leading tray.

7. An apparatus for mounting wafers according to claim 6 in which:
the feeding means for the wafers further includes
a receiving unit disposed at right angles to the track at a position beyond the wafer feeding station to receive the empty trays.

8. An apparatus for mounting wafers according to claim 7 in which:
the feeding means for the wafers further includes
means rendered effective when each empty tray is disposed in alignment with the receiving unit to move the empty tray off the track and into the unit.

9. An apparatus for mounting wafers according to claim 7 in which:
the feeding means for the wafers further includes
means operable to move each empty tray from the track and into the receiving unit,
a drive for the operable means for the supply unit and the receiving unit, and
means activated by each empty tray disposed in alignment with the receiving unit to render the drive effective.

10. An apparatus for mounting wafers according to claim 5 in which:
the feeding means for the wafers further includes
a member disposed adjacent the wafer feeding station actuated in advance of the transfer element to locate the wafer pocket at the feeding station at a given position.

11. An apparatus for mounting wafers according to claim 2 in which:
the feeding means for the wafers further includes
a supply unit having means to support a plurality of loaded trays in a plane with the track,
a pusher having projections spaced to engage the individual loaded trays, and
moving means for the pusher.

12. An apparatus for mounting wafers according to claim 11 in which:
said moving means is adapted to move the pusher in one direction toward the trays to move the projections in engagement with their trays, and move the pusher in another direction to advance all trays toward the track to position the leading tray on the track.

13. An apparatus for mounting wafers according to claim 12 in which:
said moving means is adapted further to move the pusher away from the trays to free the projections therefrom and move the pusher in another direction to condition the pusher for the next advancement of the trays.

14. An apparatus for mounting wafers of like dimensions on component headers comprising:
a turret moved intermittently between intervals of rest about an axis,
like units mounted at spaced positions on the turret and adapted to be located successively at different stations disposed about the axis,
each of said units including
(a) separate nest-like gripping jaws, and
(b) a separate transfer element,
means to operate the jaws to cause them to receive and hold the component headers at one station,
means to feed wafers successively at another station,
a transfer element for each unit,
means to cause varied movements of each transfer element to cause it to pick up a wafer at the wafer feeding station and position the wafer on the component header held by its respective gripping jaws, and
means to cause bonding of the wafer to the component.

15. An apparatus for mounting wafers according to claim 14 in which:
the bonding means includes an electrical bonding circuit including said gripping jaws.

16. An apparatus for mounting wafers according to claim 15 in which said bonding means further comprises:
means to cause vibration of the transfer element with the wafer on the component header to assure an efficient bond between the wafer and the header.

17. An apparatus for mounting wafers according to claim 15 in which said bonding means further comprises:
an ultrasonic probe mounted in each unit to engage the transfer element thereof for causing said element to vibrate the wafer on the header to effect a thorough bond therebetween.

18. The apparatus as claimed in claim 1 wherein said bonding means includes an ultrasonic probe, and a pair of electrical heating contact jaws.

19. The apparatus as claimed in claim 1 wherein said last named transfer means is vacuum operated.

References Cited

UNITED STATES PATENTS

| | | | |
|---|---|---|---|
| 2,855,496 | 10/1958 | Lawless et al. | 219—79 |
| 2,999,299 | 9/1961 | Shappell | 219—79 X |
| 3,051,026 | 8/1962 | Da Costa | 219—79 X |
| 3,056,317 | 10/1962 | Huber et al. | 78—82 |
| 3,161,753 | 12/1964 | Schmick | 219—79 |
| 3,170,059 | 2/1965 | De Moss | 219—80 |
| 3,247,355 | 4/1966 | Olsen | 219—85 |
| 3,316,382 | 4/1967 | Shumaker et al. | 219—79 |

FOREIGN PATENTS

| | | |
|---|---|---|
| 498,228 | 12/1953 | Canada. |
| 532,867 | 11/1956 | Canada. |

RICHARD M. WOOD, *Primary Examiner.*

B. A. STEIN, *Assistant Examiner.*